2,253,706

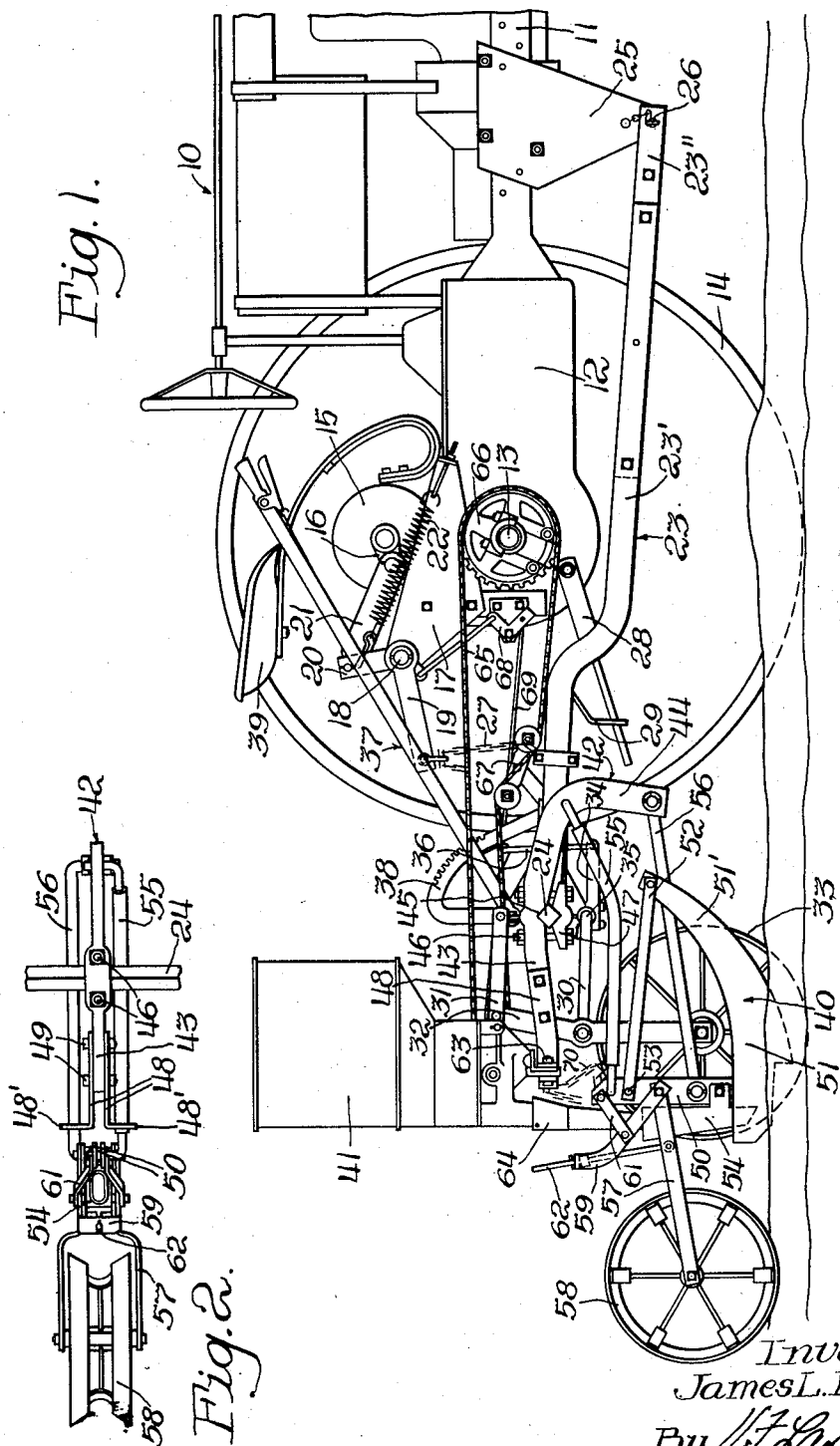
Aug. 26, 1941.   J. L. HIPPLE   2,253,706
PLANTING ATTACHMENT
Filed Jan. 19, 1939
Inventor
James L. Hipple Patented Aug. 26, 1941

UNITED STATES PATENT OFFICE 2,253,706

PLANTING ATTACHMENT

James L. Hipple, Canton, Ill., assignor to International Harvester Company, a corporation of New Jersey Application January 19, 1939, Serial No. 251,793

5 Claims. (Cl. 111—66)

This invention relates to a planting attachment for use with implement carrying frames, and particularly for use with implement carrying frames of the tool bar type.

An object of the invention is to provide a simple means for the attaching of planter units to the implement carrying frame.

Another object of the invention is to provide a planting attachment of the floating runner type which is adapted to be connected to the implement carrying frame as a unit.

Another object of the invention is to provide, in such means for attaching the planter attachment to the frame as a unit, means wherein the hopper and frame structures will be independently supported, so that the weight of the hopper and frame structure will not affect the runner structure.

In accordance with this invention, there has been provided a supporting bracket means adapted to be connected to the transverse tool bar, so as to extend forwardly thereof and rearwardly thereof, wherein the runner structure is connected to the portion extending forwardly of the transverse bar and is arranged to trail rearwardly thereof in a location immediately under the portion of the bracket means extending rearwardly of the transverse bar, while the hopper structure is carried by this portion of the bracket means that extends rearwardly of the transverse bar independently of the connection of the runner structure thereto, and is in substantially vertical alinement with the runner structure. The runner structure is connected to the forward portion of the bracket means by means of parallel links, and is permitted to have a floating action as the implement proceeds during the planting operation. The runner structure is in no way affected by the weight of the hopper and frame structure.

Another object of the invention is to provide a planting attachment of the runner type, wherein each runner unit is free to follow the contour of the ground independently of the other units for maintaining an even planting depth.

For other objects and a better understanding of the invention, reference may be had to the following detailed description taken in connection with the accompanying drawing, in which:

Figure 1 is an elevational view of the rear portion of a tractor, one of the rear wheels being removed, having an implement frame directly connected thereto, to which is connected the planter attachment of the present invention; and, Figure 2 is a plan view of the planter structure, showing the connection of the bracket means to the transverse tool bar and with the hopper structure removed.

Referring now to the drawing, there is shown a tractor indicated generally at 10, having side sills 11, and a transmission and differential housing 12. Extending through the transmission and differential housing 12 is a rear axle 13, to which is connected the rear wheel 14. On the top portion of the transmission housing 12 is a power lift device 15 having a crank arm 16.

Connected to the rear of the tractor is a vertically extending portion 17, only one being shown but there is, in fact, one located at each side of the tractor, the pair of which support a rock-shaft 18 having a rearwardly extending lifting arm 19 rigidly connected thereto. At another location on the rock-shaft 18 there is provided an arm 20, which is connected through a link 21 to the crank arm 16 of the power lift device. In order to assist in the operation of the rock-shaft to lift the implement, there is provided a helper spring means 22, which is carried by the vertically extending brackets 17.

The implement frame now to be described is of the direct connectable type of the form shown in the pending application of William S. Graham and James L. Hipple, Serial No. 182,459, filed December 30, 1937, which matured on August 29, 1939, as Patent Number 2,171,031. This implement carrying frame is of the transverse tool bar type and comprises in general, longitudinally extending members 23 and a transverse tool bar 24 of square cross section. These longitudinal members 23 are preferably made in two sections 23' and 23", in order to permit longitudinal adjustment of the frame, so that the transverse tool bar may lie nearer to the rear portion of the tractor when the implement frame is being used as a planter. The sections 23" can be connected to the section 23', so as to make the entire longitudinal frame member 23 shorter for this purpose. On the side sill members 11 there is mounted a downwardly extending side plate 25, to the lower end of which the longitudinally extending frame 23 is detachably connected by pull pin means 26. The implement carrying frame is connected to the lifting arms 19 on the rockshaft 18 through a chain 27, so that, upon operation of the power lift 15, the entire implement frame will be lifted to a transport position on the tractor. In order to maintain the lateral position of the implement frame as it proceeds during its working operation, there is provided a downwardly extending, lateral holding means 28 connected to the transmission housing 12 for vertical pivotal movement, but braced so as not to have lateral movement and adapted to extend through a slot in a downwardly extending member 29 rigid with the implement carrying frame.

When the implement carrying frame is adjusted forwardly for the attaching of planting implements, as above explained, parallel links 30 and 31 for gauge wheels are so fixed to the transverse tool bar 24 as to extend rearwardly thereof. These parallel links support a downwardly extending member 32, to the lower end of which is connected gauge supporting wheel means 33. There are normally a pair of such gauge supporting wheels on a single implement carrying frame. In order to effect a change in the height at which the tool bar is carried, these gauge wheels may be adjusted through a forwardly extending arm 34 rigid with a transversely extending portion 35 of the link 30, and this arm 34 is acted upon through a link 36 by means of a hand lever 37 acting about a quadrant 38. The hand lever extends forwardly to a point where it is easily accessible to the operator's station 39. The gauge wheel is preferably located rearwardly of the tool bar 24 when the implement frame has planting attachments attached to it. The planting attachments are heaviest of any of the attachments that are regularly used with implement carrying frames of the tool bar type, and hence it is desirable to have them as close to the rear portion of the tractor as possible in order that they can be more easily lifted by the lifting mechanism. If they are not placed in this location, the tendency is for the forward end of the tractor to be lifted upon actuation of the power lift device.

A description of the planting attachment of the present invention will now be made. Generally, the planter attachment consists of a runner structure 40, a hopper structure 41, and a bracket supporting means 42 having a longitudinally extending portion 43 and a downwardly extending portion 44. Intermediately of the longitudinally extending portion there is provided a V-shaped recess 45 adapted to fit over the top of the tool bar 24, of square cross section and having holes therethrough for the reception of clamping bolts 46 that connect a clamping plate 47 with the tool bar 24 to rigidly retain the bracket supporting means 42 on the transverse tool bar. A portion of the longitudinally extending portion 43 of the bracket means extends to a location in advance of the transverse tool bar, from which the downwardly extending portion 44 extends. The rear portion of the longitudinally extending portion 43 is formed with two hopper mounting members 48 having transversely angled portions 48'. These hopper mounting members are made rigid and a part of the bracket means by means of bolts 49.

The runner structure 40 comprises vertically extending members 50, to the lower end of which is connected the runner iron 51 supported in its angular relationship therewith by means of a brace member 52 connected at the forward turned-up end 51' of the runner and at its rear end to the upper portion of the longitudinally extending members 50 at 53. These vertically extending members 50 carry a runner boot 54, through which seed may be dropped. Extending forwardly of the vertical portion 50 and pivotally connected thereto is a pair of parallel links 55 and 56 pivotally connected forwardly to the downwardly extending portion 44 of the bracket means 42. It should thus be seen that the parallel links trailingly connect the runner structure 40 to the bracket supporting means 42 at a location forwardly of the transverse tool bar 24 and that the runner structure lies under the longitudinally extending portion 43 and rearwardly of the transverse tool bar 24.

On the rear of the vertical portion 50, there is provided a rearwardly extending press or covering wheel carrying structure 57 on which is mounted the press or covering wheel 58. While the gauge wheels 33 associated with the implements are used to effect a change in the working depth of the usual tools, which are connected to the transverse tool bar, they are not so used when these planter attachments are used. Each planter attachment has means for individually regulating its own planting depth. This is done through a rearwardly and upwardly extending frame 59 pivotally connected to the vertical members 50 at the same point as the wheel-carrying structure 57 is connected and braced to the upper ends of the vertical members by bracing members 61 and interconnected with the pivotal wheel-carrying structure 57 by means of a link 62 that extends through the upper end of the frame 59 to some distance and has means associated therewith to adjust the effective length of the same to in turn regulate the working depth of the runner structure 40.

The hopper structure 41 has means at its lower end adapted to fit onto the portions 48' of the mounting members 48. The hopper structure is fixed thereto by means of bolts 63. Thus, at this point it should be seen that the hopper structure 41 is independently and cooperatively supported relative to the runner structure 40 and that both of said structures are connected to the transverse tool bar 24 by a single bracket means 42 and that the entire planter attachment is thus attachable as a unit. In other words, means has been provided for connecting the hopper structure in a planter attachment to the implement-carrying frame without transmitting load onto the runner structure. Also, it should be seen that, when several units are attached to the transverse tool bar, an adjustment of the hoppers of the respective units may be effected in unison by adjusting the gauge wheels 33 of the implement-carrying frame. By having each runner structure 40 independent of its hopper structure, the adjustment of the planting depth of the unit is not materially affected upon adjustment of the implement-carrying frame with the hopper structures.

The seeds from the hopper structure 41 drop through a funnel 64, which is directed into the seed boot 54. The hopper structure may be operated by the usual means consisting of the shaft running transversely of the implement-carrying frame and driven by a chain 65 connected with a sprocket 66 on the rear axle 13. This chain may be kept tight by means of the chain tightener 67. The transverse shaft also includes the usual clutch mechanism, not shown, which can be thrown out of operation by means of the linkage 68 adapted to be operated by the rock-shaft 18 and connected forwardly to the clutch through the link 69, whereby, when the power lift is operated to raise the implement-carrying frame, the clutch will likewise be operated to throw the hopper structure out of operation. These latter features are generally shown in the above mentioned pending application Serial No. 182,459, and do not form a part of the present invention.

Connecting loosely between the upper ends of the vertically extending members 50 and the rearward end of the bracket-supporting means 42 is a lost-motion connection chain means 70, which may be adjustable in connection with the bracket-supporting means 42, and is preferably arranged to have considerable slack therein when the planter attachments are in their ground-working position. This slack is sufficient to permit free floating movement of the runner structure during operation. This chain 70 is for the purpose of lifting the runner structure when the implement-carrying frame is raised to the transport position by the power lift device 15.

While various changes may be made in the detail construction of this planter attachment, it shall be understood that such changes shall be made without departure from the spirit and scope of the present invention as defined in the appended claims.

What is claimed is:

1. In combination, a tractor, an implement-carrying frame adapted to be directly connected to the tractor for vertical movement and having a transverse tool bar, and a planter attachment comprising a runner structure, a hopper structure, means for trailingly and floatingly connecting the runner structure to the tool bar, means for connecting the hopper structure to the tool bar in cooperative relation to the runner structure without transmitting load onto the runner structure, and lost-motion connection means between the runner structure and the implement-carrying frame adapted to be taken up to effect lifting of the runner structure upon the implement-carrying frame being vertically moved.

2. In combination, a vertically movable implement-carrying frame, a hopper structure, a runner structure, supporting means connected to the frame and having a downwardly extending portion, parallel link means for connecting the runner structure to the downwardly extending portion for normally free vertical movement in its working position, means for connecting the hopper structure to the frame in cooperative relation to the runner structure without transmitting load onto the runner structure, and lost-motion connection means between the runner structure and the implement-carrying frame adapted to be taken up to thereby effect lifting of the runner structure upon the implement frame being vertically moved.

3. In combination, a tractor, an implement-carrying frame directly connected to the tractor for vertical adjustment, a planting attachment adapted for attachment to the implement-carrying frame comprising a runner structure, a hopper structure, means for connecting the runner structure to the frame for normally free vertical movement, means for connecting the hopper structure to the frame in cooperative relation to the runner structure without transmitting load onto said runner structure, means on the tractor for vertically adjusting the frame to a transport position, and lost motion connection means between the runner structure and the frame adapted to be taken up to lift the runner structure upon the frame being vertically adjusted to a transport position by said means on the tractor.

4. In combination, a tractor, an implement-carrying frame including a transverse tool bar directly connected to the tractor for vertical adjustment, a planting attachment adapted for attachment as a unit to the transverse tool bar and comprising a supporting bracket means adapted to be fixed to the transverse bar and having a longitudinal portion adapted to extend forwardly and rearwardly of the tool bar when the attachment is made, a runner structure trailingly and floatingly connected to said portion forwardly of the transverse tool bar, a hopper structure connected to said portion rearwardly of said transverse tool bar and in cooperative relation with the runner structure, means on the tractor for vertically adjusting the frame to a transport position, and lost motion means interconnecting the runner structure and said portion rearwardly of the transverse tool bar adapted to be taken up to lift the runner structure upon the frame being vertically adjusted to a transport position by said means on the tractor.

5. In a unitary planter attachment for use with a vertically movable implement-carrying frame, a hopper structure, a runner structure, supporting means adapted for rigid attachment to the implement-carrying frame, means for connecting the runner structure to the supporting means for normally free vertical movement, means for rigidly connecting the hopper structure to the supporting means in cooperative relation with the runner structure and without transmitting load onto the runner structure, and lost-motion connection means between the runner structure and the implement-carrying frame adapted to be taken up to thereby effect lifting of the runner structure upon the implement-carrying frame being vertically moved.

JAMES L. HIPPLE.